United States Patent [19]

Oates et al.

[11] 4,112,287

[45] Sep. 5, 1978

[54] CENTRAL OSCILLATOR FOR INDUCTION RANGE USING TRIAC BURNER CONTROLS

[75] Inventors: Robert M. Oates; Theodore M. Heinrich, both of Murrysville, Pa.

[73] Assignee: White-Westinghouse Corporation, Pittsburgh, Pa.

[21] Appl. No.: 738,904

[22] Filed: Nov. 4, 1976

[51] Int. Cl.$^2$ .............................................. H05B 5/04
[52] U.S. Cl. .......................... 219/10.49 R; 219/10.77; 363/45; 363/95
[58] Field of Search ............... 219/10.49, 10.75, 10.77; 363/41, 95, 96, 97, 98, 99, 100, 37, 49, 135, 139; 323/18; 307/252 B, 252 N, 252 UA

[56] References Cited

U.S. PATENT DOCUMENTS

| | | | |
|---|---|---|---|
| 3,434,010 | 3/1969 | Weit | 219/10.77 |
| 3,514,688 | 5/1970 | Martin | 321/2 |
| 3,786,219 | 1/1974 | Kornrumpf | 219/10.77 |
| 3,925,633 | 12/1975 | Partridge | 219/10.77 |
| 4,016,391 | 4/1977 | Kiuchi et al. | 219/10.77 |

Primary Examiner—Bruce A. Reynolds
Attorney, Agent, or Firm—McNenny, Pearne, Gordon, Gail, Dickinson & Schiller

[57] ABSTRACT

An apparatus for inductively heating cooking utensils comprising four induction cooking coils excited by a central power oscillator providing an alternating sinusoidal excitation voltage at about 25 kilohertz which is 100% amplitude modulated at 120 hertz. Power to the four induction coils is duty cycle controlled by four 60 hertz triacs each series inserted between the power oscillator and a respective one of the induction coils. The triacs switch to excite their respective induction coils only at the zero point of the excitation voltage modulation envelope. Line power fluctuations are minimized by sequential switching of the triacs in a manner that results in an effective power switching frequency of approximately 46 hertz when all four induction cooking coils are excited. The central power oscillator is inherently protected from high Q load conditions without the provision of feedback loops.

20 Claims, 12 Drawing Figures

CENTRAL OSCILLATOR FOR INDUCTION RANGE USING TRIAC BURNER CONTROLS

BACKGROUND OF THE INVENTION

This invention relates to the heating of a cooking utensil which is inductively coupled to a flat, pancake-shaped coil excited by an ultrasonic power oscillator.

More particularly, this invention relates to a central power oscillator for simultaneously exciting multiple induction cooking coils.

Many prior art induction cooking units having multiple induction cooking coils adapted and arranged to function as the burners of a domestic kitchen range, utilize a separate power oscillator for each induction coil. In such a system, power to a particular coil can be controlled by varying the operating parameters of its respective oscillator without affecting a power change in the other induction coils. For example, the operating voltage of the oscillator exciting the induction coil could be varied to control power as disclosed in U.S. Pat. No. 3,806,688 which is assigned to the assignee of this invention. Power in an induction cooking coil can also be controlled by varying the frequency of its associated power oscillator, especially where the coil is excited at a resonant or near resonant frequency. U.S. Pat. No. 3,781,505 discloses an induction cooking apparatus utilizing oscillator frequency variance for power control.

While an induction cooking apparatus utilizing separate oscillators for each induction cooking coil may yield suitable performance, the wide-spread commercialization of such an apparatus has not materialized due for the most part to prohibitive cost. An induction cooking apparatus utilizing a central oscillator powering, for example, four individual induction coils for simultaneously heating four cooking utensils would apparently be a solution to the cost problem associated with multiple oscillator induction cooking devices. However, the problem of controlling the individual coils without having a change in one coil affect the power outputs of the other coils has prevented the practical application of a central oscillator approach. Obviously, the operating parameters of a central oscillator could not be changed without affecting all of the induction heating coils. Therefore, it is necessary to devise a control means for varying the power to each induction coil without changing the operating parameters of the central oscillator.

In addition to the control need noted above, the provision of a common oscillator capable of powering four induction cooking coils would most likely require excessive semiconductor paralleling in order to handle the required power. Such semiconductor paralleling was considered undesirable especially from a reliability standpoint.

SUMMARY OF THE INVENTION

The present invention is directed to an induction cooking unit having multiple independently duty cycle controlled induction cooking coils excited by a common oscillator providing power at an ultrasonic frequency. The invention is especially adapted for but not confined to domestic cooking appliances such as kitchen ranges having a smooth ceramic top with multiple burner-like heating locations.

In accordance with the preferred embodiment of the invention, an ultrasonic square wave inverter or oscillator utilizing fast turn-off thyristors operates from a DC supply which is obtained by fully rectifying, but not filtering, a 60 hertz standard AC line voltage. The inverter chops the DC supply to provide an alternating square wave output at approximately 25 kilohertz which is fully modulated at 120 hertz. The square wave output is filtered by a series resonant LC network to provide a fully modulated alternating sinusoidal power output. Four induction cooking coils arranged as kitchen range burners adapted to be inductively coupled to cooking utensils are excited by the modulated alternating sinusoidal power. A triac is inserted in series between the alternating sinusoidal power output and each induction cooking coil. Power to each induction cooking coil is duty cycle controlled by switching its respective triac only at the zero crossing of the AC line voltage which corresponds to the zero point of the modulation envelope of the modulated sinusoidal power output so that the triac does not have to interrupt voltage or current at ultrasonic frequencies. The triacs are independently switched to provide the duty cycles necessary to achieve the desired average cooking power for each induction cooking coil.

To avoid potential light flicker problems due to line power fluctuations caused by synchronously switching all four of the triacs, the gating signals triggering the triacs are phase displaced relative to each other to cause sequential switching of the triacs, thus increasing effective switching frequency. The effective switching frequency as seen by the line is further increased by utilizing a maximum triac switching frequency period which is not a multiple of the half period of the AC line voltage so as to allow adjacent triac conduction periods having a differing number of sinusoidal power modulation envelopes relative to each other while still maintaining an acceptable power control ratio.

Power requirements of the inverter are met by utilizing fast turn-off thyristor pairs as complimentary switching elements.

Appropriate power factor correction capacitors shunt each induction coils to constitute parallel LC resonant networks which provide for inherent protection of the oscillator under high Q conditions.

BRIEF DESCRIPTION OF THE DRAWINGS

These and other aspects and advantages of the invention will become apparent to those skilled in the art upon a comprehensive understanding of the preferred embodiment of the invention shown in the accompanying drawings wherein.

DESCRIPTION OF THE PREFERRED EMBODIMENT

Figure 1:
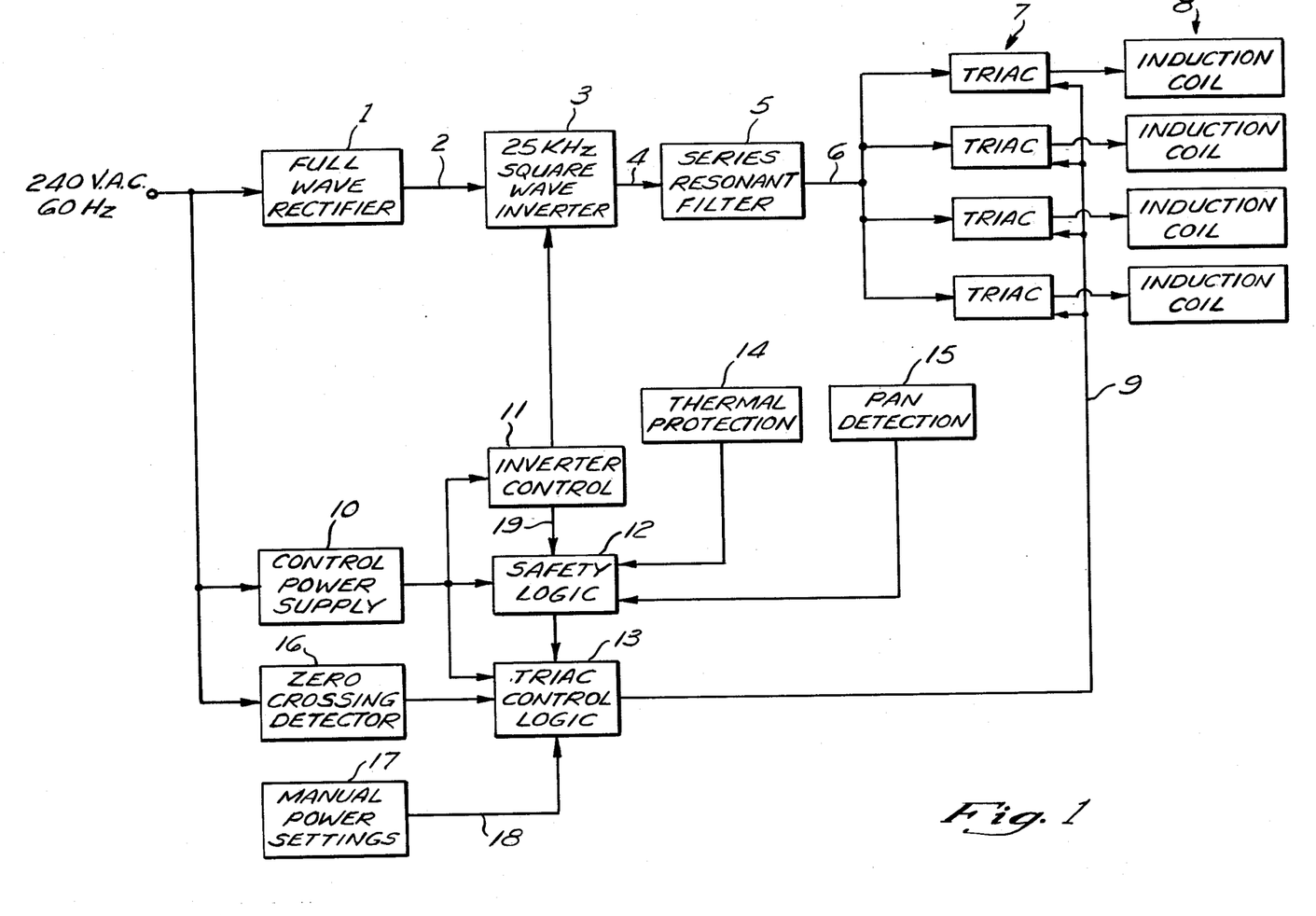
FIG. 1 is a functional block diagram of an induction cooking apparatus having four induction cooking coils in accordance with the present invention.
Figure 2:
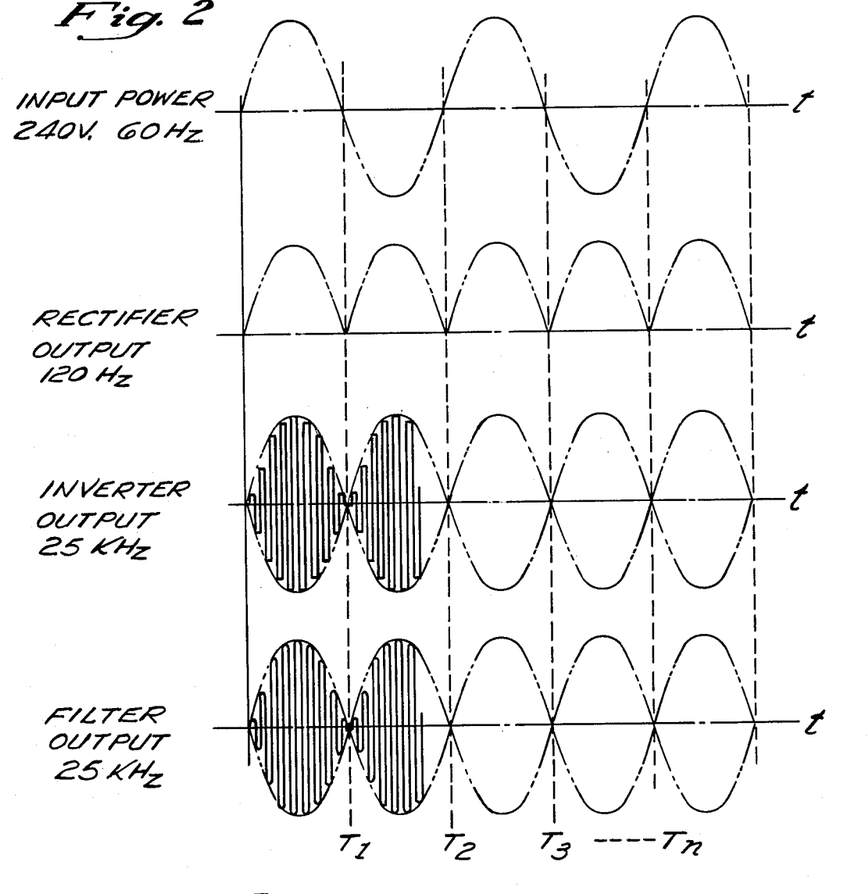
FIG. 2 is a series of waveform graphs illustrating the manner of operation of the present invention.

Referring now to the drawings in greater detail, FIG. 1 is a functional block diagram of an electronic circuit illustrating a preferred embodiment of an induction cooking apparatus in accordance with the present invention. FIG. 2 illustrates various power waveforms at selected points of FIG. 1.

Referring to FIG. 1, a standard 240 volt 60 hertz single phase AC line voltage provides input power at approximately unity power factor, as illustrated in FIG. 2, to a full wave rectifier 1. The input power is fully rectified by the rectifier 1 which provides a rectifier output 2, illustrated in FIG. 2 as 120 hertz pulsating DC power. The rectifier output 2 is inverted or chopped at a selected ultrasonic frequency of approximately 25 kilohertz by a square wave inverter 3 to provide an inverter output 4 which is a 25 kilohertz square wave fully or 100% amplitude modulated at 120 hertz as illustrated in FIG. 2. The inverter output 4 is fed through a series resonant filter 5 tuned to the fundamental frequency of the 25 kilohertz square wave inverter output 4 so as to provide a filter output 6 supplying 25 kilohertz sinusoidal power fully amplitude modulated at 120 hertz as shown in FIG. 2.

The fully modulated sinusoidal power excites multiple induction cooking coils 8 via series inserted triacs 7 which independently duty cycle control each of the induction cooking coils 8 at an effective switching frequency of approximately 12 hertz in accordance with appropriate triac gate drive signals 9.

A control power supply 10 connected to the 240 volt AC 60 hertz line provides operating power to an inverter control 11, a safety logic circuit 12 and a triac control logic circuit 13. The inverter control circuit 11 applies appropriate switching signals to the square wave inverter 3 so as to cause an inverter switching frequency of approximately 25 kilohertz. The safety logic circuit 12 provides appropriate inhibit signals to the triac control logic circuit 13 so as to preclude operation of the triacs 7 when undesirable operating conditions may exist. For example, input to the safety logic circuit 12 may include a thermal protection input 14 which would serve to modify circuit operation when an overheating condition in the induction cooking apparatus has been detected. A pan detection input 15 could also be provided to modify circuit operation wherein a particular induction coil is being excited with no cooking vessel being inductively coupled to it. An inhibit signal 19 supplied by the inverter control 11 to the safety logic circuit 12 inhibits the triacs 7 from switching to a conducting condition during the starting and stopping of the square wave inverter 3.

The triac gate drive signals 9 supplied by the triac control logic circuit 13 depend upon inputs provided by a zero crossing detector circuit 16 and a manual power settings circuit 17. The manual power settings circuit 17 provides power setting reference signals 18 which are utilized by the triac control logic circuit 13 to determine the desired conduction periods of the triacs 7 and thus the desired duty cycles and the power output for each of the induction coils 8.

The zero crossing detector circuit 16 is connected to the 240 volt AC 60 hertz line and senses when the line voltage crosses zero power point. Each time a zero crossing is sensed (approximately 120 times per second), the zero crossing detector circuit 16 provides an appropriate enable signal to the triac control logic circuit 13 which in turn provides the triac gate signals 9. Thus by design, the triacs 7 are permitted to switch to a conducting condition or a non-conducting condition only at times, illustrated in FIG. 2 as time $T_1$ through $T_n$, when the sinusoidal power output is minimal, the power output being in the form of power pulses defined by a pulse train of generally identical modulation envelopes having associated zero points coincident with the zero crossing of the line voltage. The triacs 7 turn on or off when there is virtually no high frequency voltage or current being applied to the induction coils 8 so as to regulate the power to each induction coil by supplying to each coil a selective number of power pulses.

Many advantages are obtained in applying the sinusoidal output power to the induction coil 8 by switching the triacs 7 only at the zero crossing point, $T_1$ through $T_n$, of the line voltage. For example, conventional low cost 60 hertz triacs may be used to control ultrasonic frequency power since the low modulation frequency of 120 hertz makes triac switching possible. Further, the sinusoidal power, selectively applied to the induction coils 8 via the triacs 7, has a moderate $dv/dt$ rate of rise so as to allow the triacs to effectively block voltage. Also, in previous attempts to regulate power by duty cycle control, the sudden interruption or application of ultrasonic frequency power to an induction coil resulted in an undesirable audible ping occurring at the switching frequency. This phenomenon, does not occur in the triac control scheme noted above because the high frequency power builds at a much slower rate due to its low frequency sinusoidal modulation.

Figure 3:
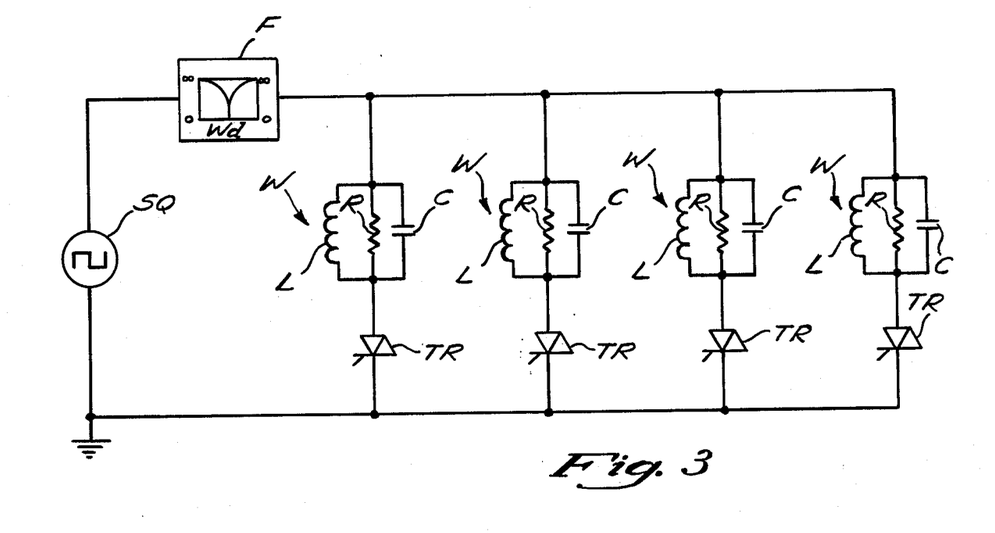
FIG. 3 is a rudimentary schematic diagram of a circuit operable in accordance with the present invention.

Turning to FIG. 3, there is illustrated a rudimentary schematic diagram of a power oscillator circuit for exciting four induction cooking or heating coils operable in accordance with the present invention.

An inverter SQ provides a square wave at an ultrasonic operating frequency $W_d$ of approximately 25 kilohertz which is fully amplitude modulated at a much lower frequency such as 120 hertz. The square wave is sent through a filter F, diagrammatically illustrated as an ideal filter which presents zero impedance to the fundamental of the square wave at the operating frequency $W_d$ and infinite impedance to the harmonics of the square wave at the operating frequency $W_d$. The resultant modulated sinusoidal output is applied to excite multiple parallel connected induction cooking or work coils W which are each represented as parallel L-R circuits comprised of inductors L and resistors R.

It is apparent that the magnitude of the modulated sinusoidal output is relatively independent of the load provided by the work coils so that any number of work coils W can be excited at the operating frequency $W_d$ without one work coil affecting another work coil.

As previously illustrated, triacs TR are series inserted between the sinusoidal power output and the work coils W to duty cycle control the excitation of the work coils W, wherein the triacs TR turn on or off to excite their respective induction coils W only at the zero point of the modulation envelope of the sinusoidal power output.

In order to enhance effective switching of the triacs TR the work coils W are shunted by parallel connected capacitors C which are each of a capacitance that will approximately balance the inductive components of their respective work coils W at the operating frequency $W_d$. The capacitors C can be considered as power factor correction devices.

Thus from the standpoint of the inverter SQ and the triacs TR, the work coils W are made to appear as purely resistive loads due to the effect of the power correction capacitors C, thus significantly lowering the amount of current provided by the inverter SQ and switched by the triacs TR.

Further, the circuit illustrated in FIG. 13 is inherently protected from high Q conditions caused for example by removal of a cooking vessel being inductively heated by one of the work coils W.

The work coils W and their respective power factor correction capacitors C are in effect parallel RLC load circuits designed to resonate at the operating frequency $W_d$. As a cooking vessel is removed, the Q of the parallel RLC circuit increases as does its effective impedance. The work coil current inherently decreases when the cooking vessel is removed. The inverter SQ and triacs TR can easily tolerate this condition thus precluding the need for feedback loops to alter the operating voltage or frequency of the inverter. The circuit illustrated behaves in a more desirable fashion as contrasted to prior art circuits utilizing series resonant loads.

In addition to previously mentioned features the filter F serves to reduce the harmonic content of the modulated sinusoidal power exciting the work coil W, thus making tolerable the static $dv/dt$ handled by the triacs TR. Radio frequency interference is also reduced. The filter F eliminates the need for high harmonic currents to be supplied by the square wave inverter as would be the case if a square wave was supplied directly across the work coils W and their respective power correction capacitors C.

Figure 4:
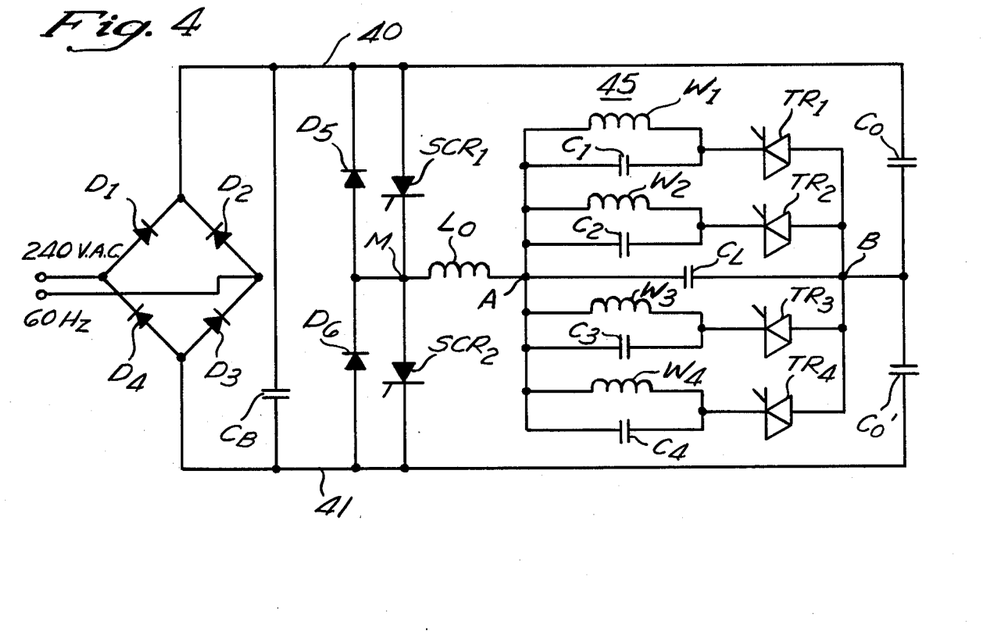
FIG. 4 is a simplified schematic diagram of a half-bridge power oscillator utilizing complimentary thyristor switches to excite four triac controlled induction cooking coils with power factor correction in accordance with the present invention.

FIG. 4 is a simplified schematic diagram of a half-bridge power oscillator circuit with switching triacs operable to excite four induction cooking coils in accordance with the present invention.

Although a half-bridge oscillator is illustrated, it should be understood that a full-bridge oscillator could be employed utilizing the same general principles of operation noted previously.

The function of the power oscillator circuit is to convert 240 volt 60 hertz AC line power into the ultrasonic fully modulated duty cycle controlled sinusoidal power exciting the induction coils.

The half-bridge oscillator circuit includes a full wave bridge rectifier comprised of diodes $D_1$ through $D_4$, a square wave inverter including complimentary thyristor switches $SCR_1$ and $SCR_2$, a series resonant LC network filter constituted by a filter inductor $L_o$ and half-bridge capacitors $C_o$ and $C_o'$, switching triacs $TR_1$ through $TR_4$ and induction work coils $W_1$ through $W_4$.

In operation the diodes $D_1$ through $D_4$, convert 240 volt, 60 hertz AC line power into 120 hertz, pulsating DC power having an amplitude varying at regular intervals between a zero voltage level and a maximum voltage level, illustrated in FIG. 2 as the rectifier output. The 120 hertz pulsating DC rectifier output is supplied across DC supply lines 40 and 41.

The rectifier output is inverted or chopped by two thyristor switches $SCR_1$ and $SCR_2$ connected in series with each other across the DC power supply lines 40 and 41. The two thyristor switches $SCR_1$ and $SCR_2$ are connected to each other in complementary fashion, anode-to-cathode, at a midpoint M.

While thyristor switches are illustrated it should be noted that other switching means could be utilized such as transistors. In particular, the thyristor switches illustrated are known as fast-turn-off thyristors which have a turn-off time less than 4 microseconds.

A specific example of a suitable thyristor is one manufactured by the RCA Corporation and known as a TA8849M.

The filter inductor $L_o$ is connected between the midpoint M and a loading point A while half-bridge capacitors $C_o$ and $C_o'$ are each connected between a loading point B and each of the DC supply lines 40 and 41 as illustrated.

A load network 45, connected between loading point A and loading point B, is constituted by the four parallel connected induction work coils $W_1$ through $W_4$ with associated parallel connected power correction capacitors $C_1$ through $C_4$. One end of each work coil and its parallel power correction capacitor is connected to loading point A while the other ends of the work coils and power correction capacitors are connected to loading point B via series inserted triacs $TR_1$ through $TR_4$ which serve to duty cycle control their respective work coils $W_1$ through $W_4$.

A lead angle capacitor $C_L$ is connected across loading point A and loading point B to shunt the load network 45.

The lead angle capacitor $C_L$ functions to supply an appropiate leading power factor for the load network 45 as a whole so as to provide the thyristor switches $SCR_1$ and $SCR_2$ with the necessary turn-off time. Thus, the current in the thyristor switches $SCR_1$ and $SCR_2$ goes to zero at a given time before the thyristor switches are forced to block forward voltage during the turn-off time of the thyristor switches.

Antiparallel connected diodes $D_5$ and $D_6$ are provided across the thyristor switches $SCR_1$ and $SCR_2$ to handle the flow of reverse or reactive currents during the turn-off time of the thyristor switches since it is desirable that the current through the load network 45 be continuous.

In operation the thyristor switches $SCR_1$ and $SCR_2$ are force commutated to conduct reciprocally, each at a 50% duty cycle, to provide an alternating potential across loading points A and B at an ultrasonic frequency of approximately 25 kilohertz.

When the thyristor switch $SCR_1$ is conducting and the thyristor switch $SCR_2$ is non-conducting, current flows through the load network 45 from loading point A to loading point B via filter inductor $L_o$. This current flow divides equally between the filter capacitors $C_o$ and $C_o'$. The current flowing through the capacitor $C_o$ returns to the anode of thyristor $SCR_1$ while the current flowing through capacitor $C_o'$ flows to DC supply line 41. Conversely, when the thyristor switch $SCR_2$ is conducting and $SCR_1$ is nonconducting, current flows through the load network 45 from loading point B to loading point A. One half of this current is derived from supply line 40 via capacitor $C_o$ while the other half of this current flows from the cathode of $SCR_2$ via capacitor $C_o'$. The total current flows through the load network 45, through the filter inductor $L_o$ and to the anode of thyristor $SCR_2$.

In operation the filter inductor $L_o$ in conjunction with capacitors $C_o$ and $C_o'$ constitute a series resonant L-C filter network. The values of the filter inductor $L_o$ and the half-bridge capacitors $C_o$ and $C_o'$ are chosen so as to provide resonance at the operating frequency $W_d$. A series resonant L-C filter network is utilized because it is relatively lossless and because it can be made to have a sharp response to one frequency thus acting for the most part as the filter F illustrated in FIG. 3. While it would be desirable to have the filter inductor $L_o$ as small as possible and the half-bridge capacitors $C_o$ and $C_o'$ as large as possible so as to minimize the KVA requirement of each, in practice the actual values would be determined by the allowable harmonic content of the load voltage.

A power supply bypass capacitor $C_B$ is provided across the DC supply lines 40, 41 and functions to provide high frequency ripple current to the inverter. The power supply bypass capacitor $C_B$ is not large enough to appreciably filter the 120 hertz sinusoidal modulation voltage provided across the DC supply lines 40 and 41.

Figure 5:
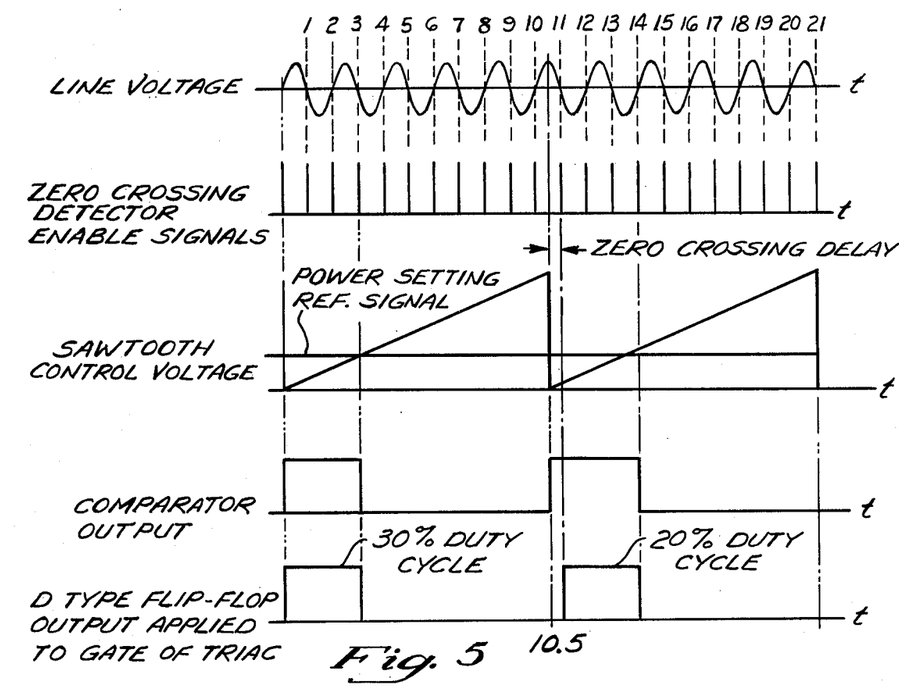
FIG. 5 is a series of waveform graphs illustrating the gating signals applied to the triacs in accordance with the present invention.

Turning to FIG. 5, there is shown a series of waveform graphs as a function of time illustrating a gating signal applied to a triac in accordance with the present invention.

As previously discussed, the switching on and off of the triacs and thus the excitation of the work coils is done only at the zero crossing of the 60 hertz line voltage, the zero crossing corresponding to the zero point of the modulation envelope of the 120 hertz sinusoidal modulated sinusoidal excitation power.

In practice it has been found that a power control ratio of 20 to 1 is desirable, thus the power which is directly proportonal to the duty cycle of the triac drive must vary from 5% to 100% of full power in 5% increments or less. It is apparent that the minimum duty cycle would occur when a triac was on for one half cycle of the 60 hertz line voltage and off for 19 half cycles of the 60 hertz line voltage, resulting in a triac switching frequency of 6 hertz.

A switching frequency of 6 hertz may be unacceptable because it may cause fluctuations in the line voltage, which may result for example in excessive room light flickering which may be irritating to a person utilizing the present induction cooking apparatus as a domestic cooking range.

The waveform graphs of FIG. 5 illustrates means for increasing the effective individual triac switching frequency to approximately 12 hertz which is more acceptable from a line power variation standpoint.

In general, switching is accomplished by use of a "whistle click" type method wherein a first signal in the form of a sawtooth control voltage having a fixed frequency is generated whose period is by design not a multiple of the half period of the 60 hertz line voltage. In FIG. 5, the sawtooth control voltage illustrated has a period of 10.5 half cycles of the line voltage frequency. The sawtooth control voltage is compared to a second signal of constant amplitude in the form of a DC power setting reference signal resulting in a third signal in the form of comparator output at the fixed frequency of the sawtooth control voltate as illustrated. The comparator output signals are of a duration or period equal to those periods of time when the amplitude of the first signal exceeds or conversely is less than the amplitude of the second or reference signal as illustrated in FIGS. 5 and 6.

The comparator output is fed to a D-type flip-flop which in turn initiates the application of a gate drive signal to its respective triac only when a fourth or enable pulse signal from the zero crossing detector is received, wherein the fixed period of the sawtooth control voltage is not a whole number multiple of the approximate time period between zero crossing pulses. The D-type flip-flop serves as a means for synchronizing the application of the comparator output with the enable pulse signal from the zero crossing detector.

Due to the misalignment of the sawtooth control voltage and the zero crossing detector enable signals, adjacent conduction periods for a triac may differ. In FIG. 5, the first conduction period illustrated has a duty cycle of approximately 30%, while the second conduction period has a duty cycle of approximately 20%. It is apparent that the resultant average power applied by the triac to its respective work coils is approximately 25%. It is only possible for adjacent conduction periods to differ from each other by one-half-cycle of the 60 hertz line voltage, thus precluding significant instantaneous power variations.

Figure 6:
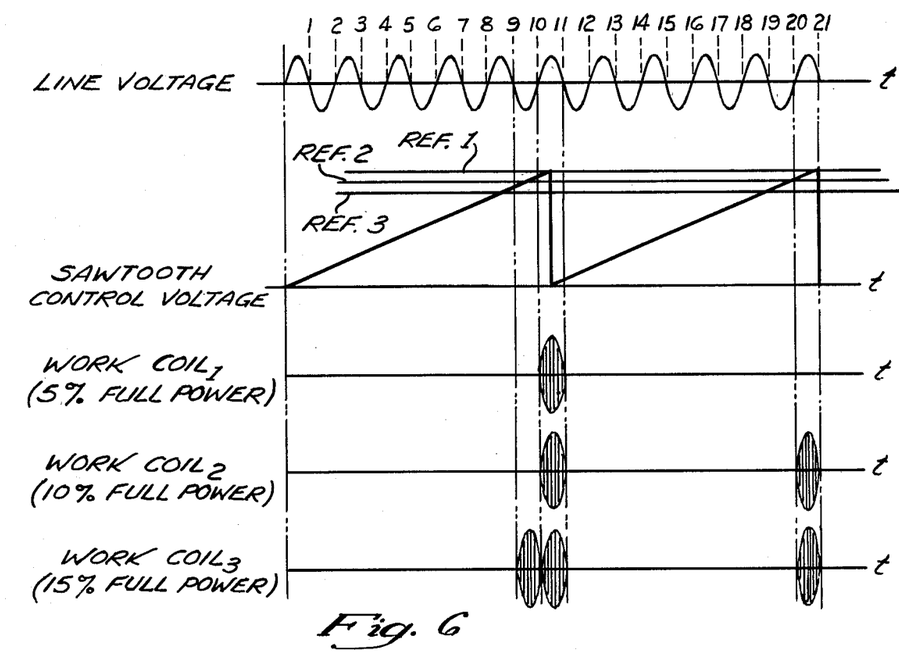
FIG. 6 is a series of waveform graphs illustrating the switching of three triacs in accordance with three power reference signals and the resultant power applied to three induction cooking coils via the triacs in accordance with the present invention.

FIG. 6 further illustrates by waveform graphs the switching action of the triacs utilizing a common sawtooth control voltage wherein three power setting reference signals, each of which determines the power level of an induction work coil, are compared to a sawtooth control voltage having a period equal to 10.5 half cycles of the 60 hertz line voltage. Because switching is delayed until zero crossing of the line voltage, the number of sinusoidal power pulses exciting an induction work coil may be different in adjacent conduction periods as illustrated thus allowing for a faster induction coil triac switching frequency of approximately 12 hertz while still achieving the desired 20 to 1 power control range.

Where a plurality of induction cooking coils are excited, the effective load switching frequency as seen by the line can be further increased by phase delaying the triac switching signals of each work coil relative to each other, so that the triacs switch sequentially.

Figure 7:
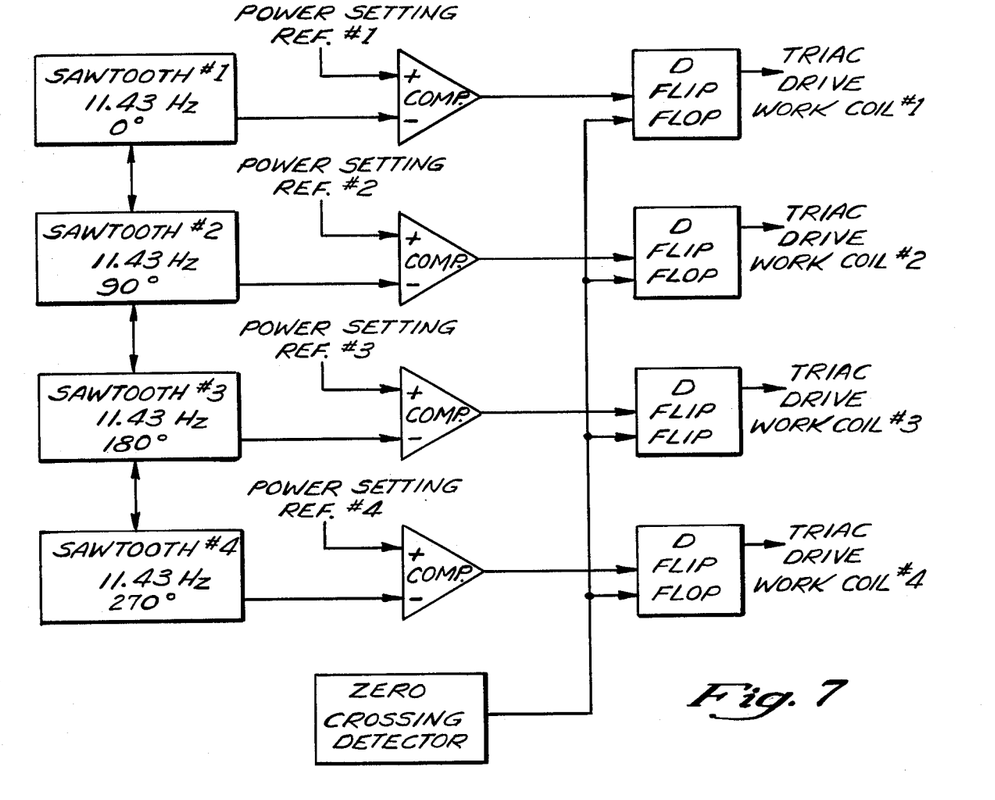
FIG. 7 is an illustrative block diagram of a phase displaced triac control logic circuit for driving the triacs illustrated in FIG. 8.

FIG. 7 illustrates in functional block diagram form a circuit for duty cycle controlling four work coils of the preferred embodiment of the present invention. As illustrated, four 11.43 hertz sawtooth control signals are used, each phase displaced from the other by 90 electrical degrees. Each sawtooth is compared to its appropriate power setting reference signal. The comparison result is fed to a D-type flip-flop and is then passed on to a triac drive circuit when an appropriate enable signal is received at the flip-flops from the zero crossing detector.

By utilization of the circuitry and method discussed with reference to and as illustrated by FIGS. 5, 6, and 7 it is possible to provide an effective power switching frequency of approximately 46 hertz so as to preclude any problems associated with lower switching frequencies while still being able to provide a desired power control ratio.

Figure 8:
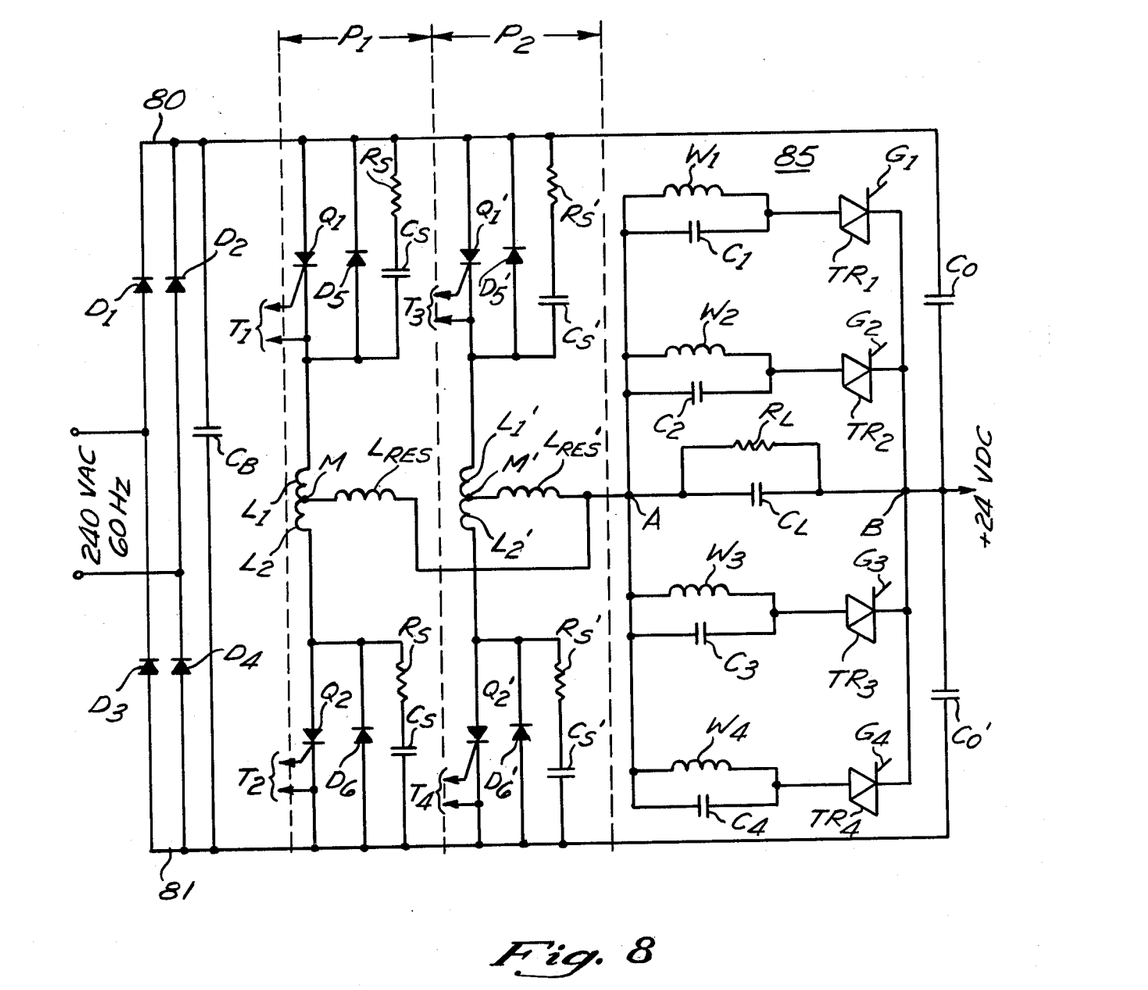
FIG. 8 is a detailed schematic diagram of a power oscillator for exciting a plurality of induction cooking coils including a full wave rectifier, an ultrasonic square wave inverter and a series LC filter network for providing power through four series inserted triacs to four induction cooking coils each having power factor correction.

FIG. 8 is a detailed schematic diagram of an electronic circuit constituting a central power oscillator with triacs for exciting and duty cycle controlling a plurality of induction cooking or work coils in accordance with the preferred embodiment of the present invention.

As illustrated by FIG. 8, a full wave bridge rectifier constituted by rectifier diodes $D_1$ through $D_4$ fully rectifies the 240 VAC, 60 hertz line power to provide 120 hertz pulsating DC power to DC power lines 80 and 81.

A power supply bypass capacitor $C_B$ is connected across the DC supply lines 80 and 81 and functions to supply high frequency ripple current for a square wave inverter constituted by first and second power poles $P_1$ and $P_2$.

The first power pole $P_1$ includes thyristors $Q_1$ and $Q_2$ connected to each other, cathode-to-anode, at a midpoint M via identical inductors $L_1$ and $L_2$ which function as di/dt chokes.

The thyristors $Q_1$ and $Q_2$ are shunted by antiparallel connected reverse current diodes $D_5$ and $D_6$.

The thyristors $Q_1$ and $Q_2$ are also each paralleled by dv/dt suppression networks formed by series connected resistors $R_s$ and capacitors $C_s$.

The second power pole $P_2$ is constituted by elements identical in structure and function to those of the first power pole $P_1$. The components of the second power pole $P_2$ carry the primed reference characters of the first power pole $P_1$.

The first and second power poles $P_1$ and $P_2$ are paralleled to provide the necessary load current to a load network 85 connected between a loading point A and a loading point B. Current sharing between the first and second power poles $P_1$ and $P_2$ is ensured by first and second resonating chokes $L_{RES}$ and $L_{RES}'$ which are connected between the midpoints M and M' and loading point A.

Paralleling of the power poles $P_1$ and $P_2$ is necessary, where the thyristors $Q_1$, $Q_1'$ and $Q_2$, $Q_2'$ are those manufactured by the RCA Company and known as TA8849M, in order to supply the necessary load current. Utilization of other power switching elements or different load requirements may preclude the need for multiple power poles.

A series resonant LC filter is provided by the resonating chokes $L_{RES}$ and $L_{RES}'$, which taken together constitute and function as the filter inductor $L_o$ illustrated in FIG. 4, and split bridge capacitors $C_o$ and $C_o'$ which are each connected between the loading point B and one of the DC supply lines 80 and 81.

The load network 85 connected between loading point A and loading point B is constituted by four induction work coils $W_1$ through $W_4$ each paralleled by one of four power correction capacitors $C_1$ through $C_4$.

The total load network 85 is shunted by a lead angle capacitor $C_L$ shunted by resistor $R_L$ which as discussed previously functions to provide the necessary turn-off time for the fast-turn of thyristors $Q_1$, $Q_1'$ and $Q_2$, $Q_2'$ which as noted have of a turn-off time of approximately 4 microseconds.

Four triacs $TR_1$ through $TR_4$ are each in series with one of the work coils $W_1$ through $W_4$ and are independently switched to duty cycle control their respective work coils in accordance with switching signals received at triac gates $G_1$ through $G_4$.

The thyristors $Q_1$, $Q_2$ and $Q_1'$, $Q_2'$ conduct reciprocally in accordance with switching signals received at thyristor gates $T_1$ through $T_4$.

Figure 9:
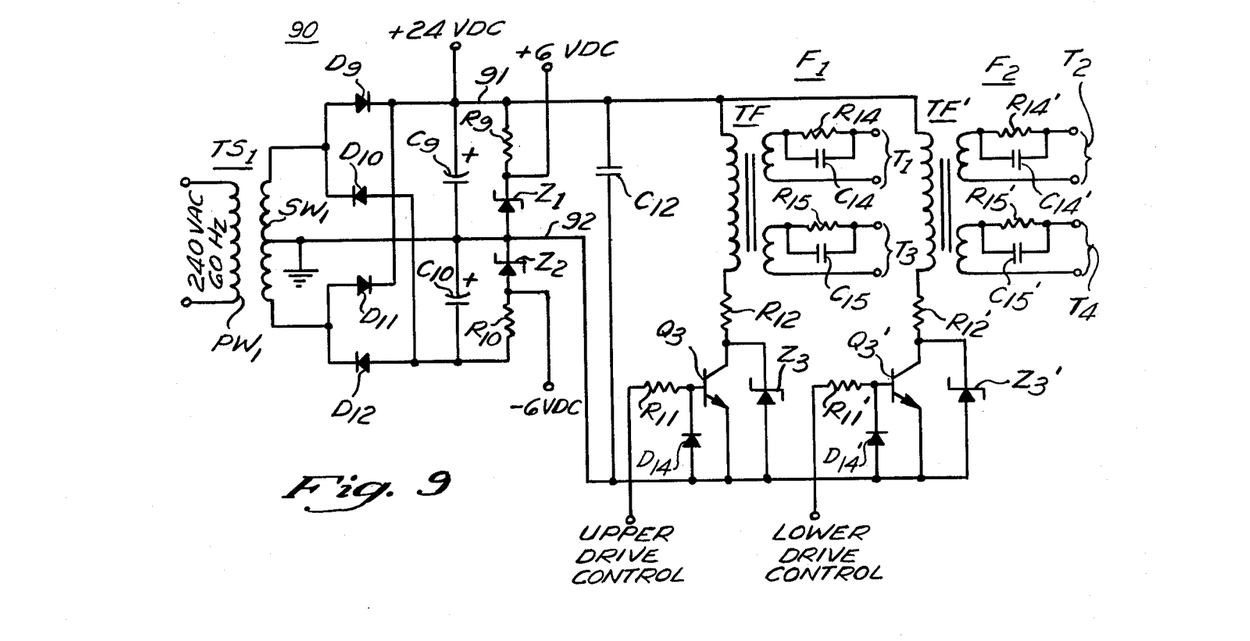
FIG. 9 is a detailed schematic diagram of a control power supply and a thyristor inverter gate drive circuit operable with the power oscillator of FIG. 8.

FIG. 9 is a detailed schematic drawing of a control power supply and a thyristor gate drive circuit operable with the oscillator illustrated in FIG. 8.

A control power supply 90 includes a step-down transformer $TS_1$ having a primary winding $PW_1$ connected to a 240 VAC, 60 hertz line source and a centertap grounded secondary winding $SW_1$ providing an output which is rectified by diodes $D_9$ through $D_{12}$ and filtered by capacitors $C_9$ and $C_{10}$ to supply a +24 unregulated source between DC supply lines 91 and 92. A +6 VDC source and a −6 VDC source is provided by zener diodes $Z_1$ and $Z_2$ and associated resistors $R_9$ and $R_{10}$. A filter capacitor $C_{12}$ is connected between DC supply lines 91 and 92.

The +24 VDC source is applied to the center point of split capacitors $C_o$ and $C_o'$ at loading point B as indicated in FIG. 8 in order to provide a common drive point for the triacs $TR_1$ through $TR_4$. In light of the ultrasonic frequency voltage between the primary winding $PW_1$ and the secondary winding $SW_1$, the step-down transformer $TS_1$ must be wound for low interwinding capacitance. For example, the primary winding $PW_1$ and the secondary winding $SW_1$ could be placed on different legs of a "C" type core.

Two inductive type firing circuits $F_1$ and $F_2$ function to drive the gates of the four inverter thyristors $Q_1$, $Q_2$ and $Q_1'$, $Q_2'$ illustrated in FIG. 8. Transistors $Q_3$ and $Q_3'$, with associated resistors $R_{11}$ and $R_{11}'$, diodes $D_{14}$ and $D_{14}'$ and zener diodes $Z_3$ and $Z_3'$, are each connected to the primaries of firing transformers TF and TF' via resistors $R_{12}$ and $R_{12}'$ as illustrated.

When the transistors $Q_3$ and $Q_3'$ are in a conducting condition, current builds up in the primaries of their respective firing transformers TF and TF' which are gapped for a specific inductance, and the thyristor gates $T_1$ through $T_4$, connected to the secondaries of the firing transformer TF and TF' via parallel RC circuits constituted by resistors $R_{14}$, $R_{14}'$, $R_{15}$, $R_{15}'$ and capacitors $C_{14}$, $C_{14}'$, $C_{15}$, $C_{15}'$, are reverse biased. When the transistors $Q_3$ and $Q_3'$ are switched to a non-conducting condition current flows through the gates $T_1$ through $T_4$ to switch the thyristors $Q_1$, $Q_1'$ and $Q_2$, $Q_2'$ to a conducting condition.

The inductive storage type of firing circuit was used because it provides an inherent reverse bias during the thyristor non-conducting period so as to achieve the desired turn-off time of 4 microseconds.

Figure 10:
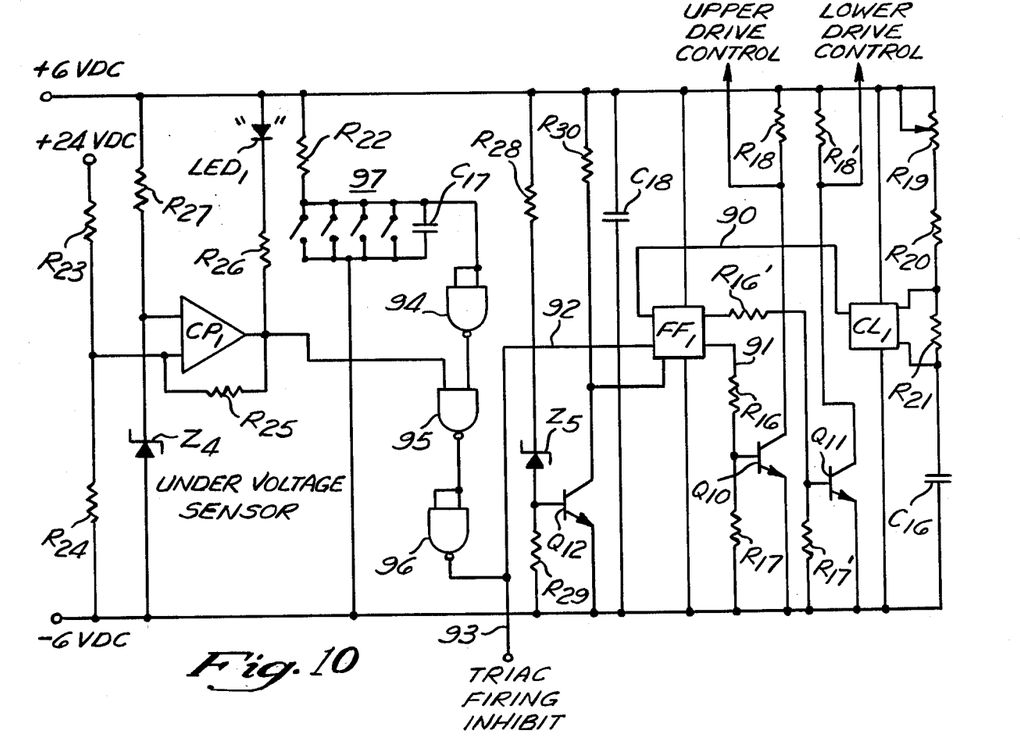
FIG. 10 is a detailed schematic diagram of an inverter control circuit operable with the power oscillator of FIG. 8.

FIG. 10 is a detailed schematic drawing of a thyristor control circuit operable with the oscillator illustrated in FIG. 8 and the control power supply and thyristor gate drive circuit illustrated in FIG. 9.

A JK flip-flop $FF_1$, in clocked from a 50 kilohertz output 90 of a universal timer $CL_1$. The JK flip-flop output 91 is utilized to alternately switch an upper drive transistor $Q_{10}$ and a lower drive transistor $Q_{11}$. Transistors $Q_{10}$ and $Q_{11}$ with associated resistors $R_{16}$, $R_{16}'$, $R_{17}$, $R_{17}'$ and $R_{18}$, $R_{18}'$, function to supply base drive to firing circuit transistors $Q_3$ and $Q_3'$ as illustrated in FIG. 9.

Appropriate power to the universal timer $CL_1$ is provided by a series network including a variable resistor $R_{19}$, a fixed resistor $R_{20}$, a fixed resistor $R_{21}$ and a capacitor $C_{16}$.

The thyristor gate firing circuits $F_1$ and $F_2$ of FIG. 9 are started and stopped by means of a J input 92 to the flip-flop $FF_1$. The J input 92 is appplied to the flip-flop $FF_1$ by a NAND gate network constituted by three NAND gates 94, 95 and 96, contained for example in integrated circuit form.

An input to the NAND gate 94 is supplied by four power setting ON-OFF switches 97 which are paralleled by a capacitor $C_{17}$. The switches 97 are connected to the +6 VDC supply via a resistor $R_{22}$ and are connected to the −6 VDC line as indicated. Each of the power setting ON-OFF switches 97 is associated with one of the work coils $W_1$ through $W_4$, wherein manual closing or opening of each switch by a range user indicates the desired energization or deenergization of one or more of the work coils $W_1$ through $W_4$, the closing of any of the four ON-OFF switches 97 permitting the starting of the thryristor gate firing circuits $F_1$ and $F_2$.

An under voltage sensor circuit is constituted by a comparator $CP_1$, resistors $R_{23}$, $R_{24}$, $R_{25}$, $R_{26}$ and $R_{27}$, zener diode $Z_4$ and a low voltage indicator light emitting diode $LED_1$. Both the power setting switches 97 and the under voltage sensor serve to start or stop the thyristor firing circuits $F_1$ and $F_2$ such that the oscillator illustrated in FIG. 8 is always started in synchronism with the 50 kilohertz output 90 of the universal timer $CL_1$. Synchronism is required in order to avoid inverter commutation failures.

Thyristor control circuit regulated voltage and current requirements are provided by a transistor $Q_{12}$ associated with resistors $R_{28}$, $R_{29}$ and $R_{30}$, zener diode $Z_5$ and capacitor $C_{18}$.

An inhibit signal is supplied via line 93 to preclude the triacs $TR_1$ through $TR_4$ from switching during the starting and stopping of the inverter.

Figure 11:
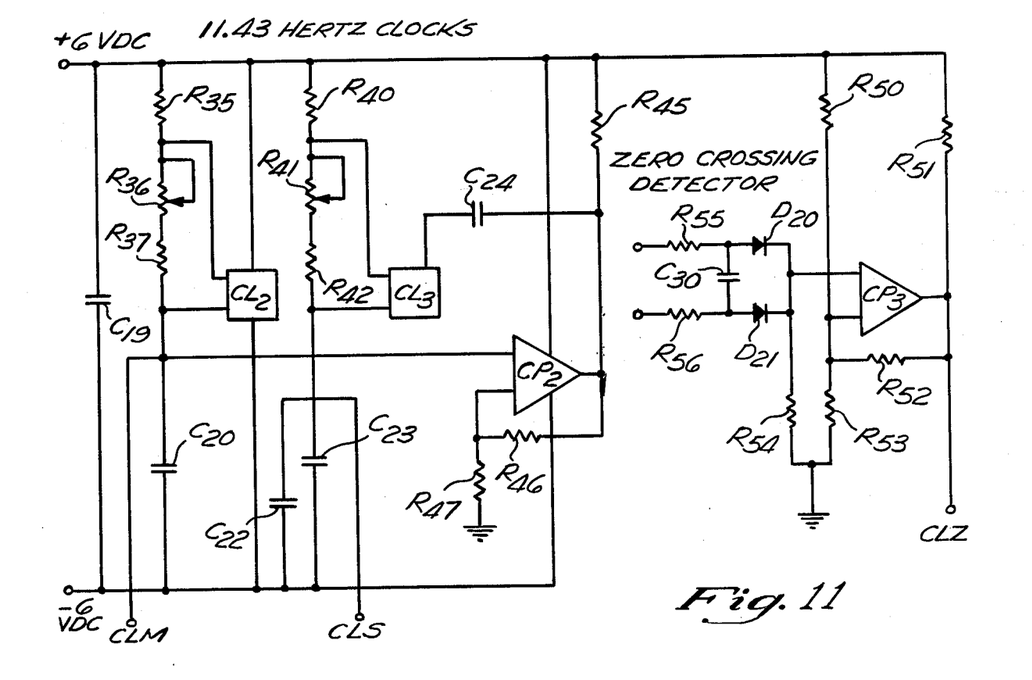
FIG. 11 is a schematic diagram of a low frequency clock circuit operable with the power oscillator of FIG. 8.
Figure 12:
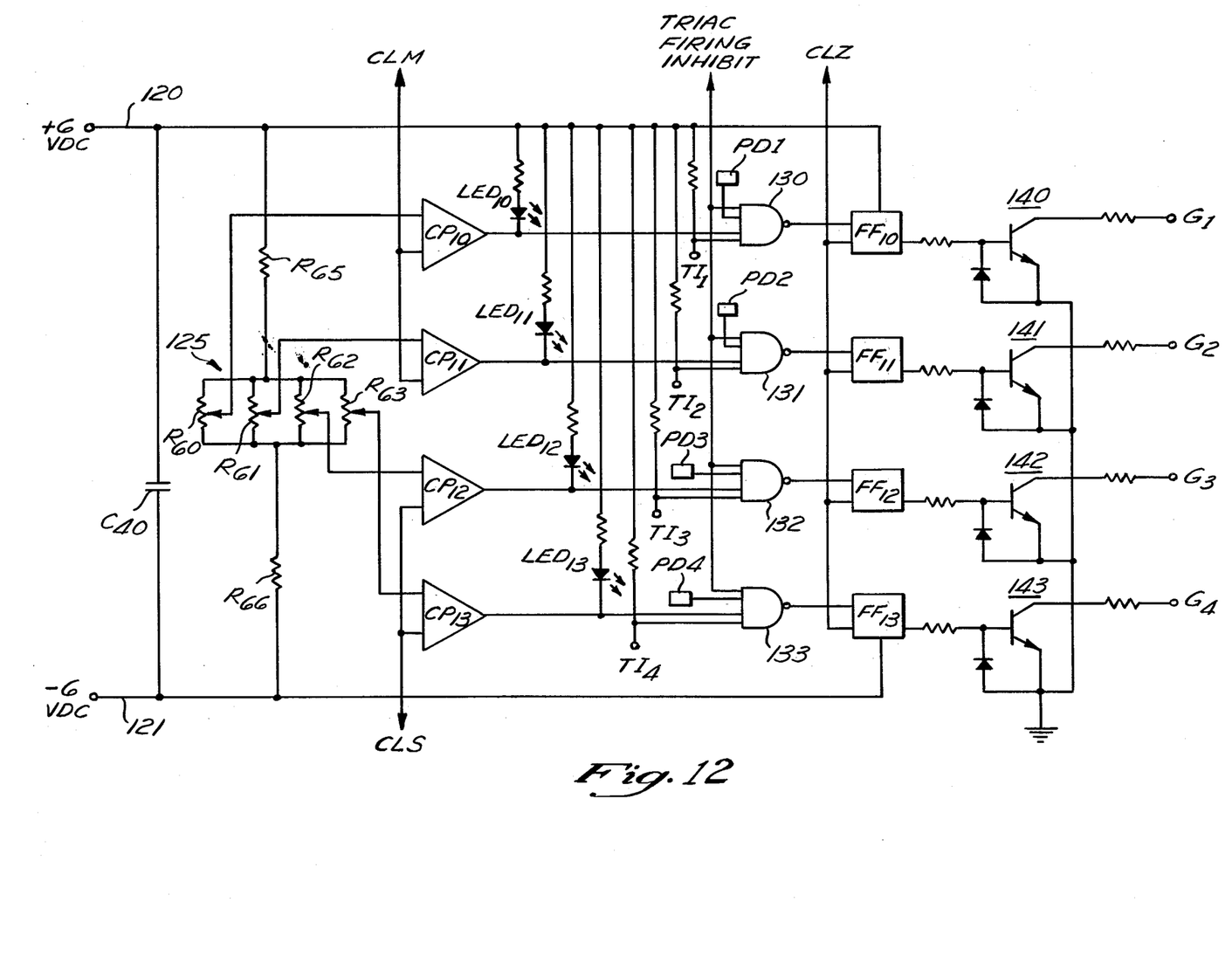
FIG. 12 is a detailed schematic diagram of a triac drive and control circuit including safety logic circuitry and manual power setting reference means operable with the power oscillator of FIG. 8.

FIG. 11 is a detailed schematic diagram of a low frequency clock circuit for providing necessary timing signals to a triac control circuit illustrated in FIG. 12.

A filter capacitor $C_{19}$ is connected between a +6 VDC power supply line and a −6 VDC power supply line. A master clock $CL_2$ and a slave clock $CL_3$ each provide an 11.43 hertz sawtooth at a master clock output CLM and a slave clock output CLS. Associated with the master clock $CL_2$ are resistors $R_{35}$, $R_{36}$, $R_{37}$ and capacitor $C_{20}$. Associated with the slave clock $CL_3$ are resistors $R_{40}$, $R_{41}$, $R_{42}$ and capacitors $C_{22}$, $C_{23}$, $C_{24}$. The phase of the slave clock $CL_3$ is forced to be approximately 90 electrical degrees away from the phase of the master clock $CL_2$ by means of a comparator $CP_2$ connected in circuit as illustrated with associated resistors $R_{45}$, $R_{46}$ and $R_{47}$.

A zero crossing detector constituted by a comparator $CP_3$, resistors $R_{50}$, $R_{51}$, $R_{52}$, $R_{53}$, $R_{54}$, $R_{55}$, $R_{56}$, diodes $D_{20}$, $D_{21}$ and a capacitor $C_{30}$, functions to provide a sync pulse output CLZ supplying sync pulses at 120 hertz coincident with the zero crossing of the input line voltage.

FIG. 12 is a detailed schematic diagram of a triac control circuit operable with the circuits illustrated in FIGS. 8, 9, 10 and 11.

The triac control circuit functions to drive the triacs $TR_1$ through $TR_4$ so as to produce the desired output power of each of the work coils $W_1$ through $W_4$.

A filter capacitor $C_{40}$ is connected between a +6 VDC line 120 and a −6 VDC line 121. A power settings reference signal parallel network 125 constituted by four parallel connected variable resistors $R_{60}$, $R_{61}$, $R_{62}$, $R_{63}$, is connected to the +6 VDC line 120 via resistor $R_{65}$ and is connected to the −6 VDC line 121 via resistor $R_{66}$.

The power setting reference network provides four DC reference signals, each corresponding to the desired power output of one of the four respective work coils $W_1$ through $W_4$ illustrated in FIG. 8, to four comparators $CP_{10}$ through $CP_{13}$. The comparators $CP_{10}$ through $CP_{13}$ serve to compare the DC reference signals to the sawtooth clock signals CLM and CLS (according to the teachings as illustrated by FIGS. 5 and 6) derived from the circuit illustrated in FIG. 11. By an appropriate arrangement of the polarities of the DC reference signals and the clock signals CLM and CLS, the outputs of the comparators $CP_{10}$ through $CP_{13}$ are equally phase shifted from each other by 90 electrical degrees in accordance with the teaching as illustrated by FIG. 7.

The outputs of the comparators $CP_{10}$ through $CP_{13}$ are fed to four NAND gates 130, 131, 132, 133, where they are gated with other signals functioning to ensure safe operation, namely pan detector inputs PD1 through PD4, thermal input signals TI1 through TI4 and the triac firing inhibit signal derived from the thyristor control circuit illustrated in FIG. 10.

The pan detector inputs PD1 through PD4, derived from a suitable pan detecting apparatus (not illustrated), serve to preclude excitation of the work coils that have no cooking vessel inductively coupled to them.

The thermal inputs TI1 through TI4 serve to preclude excitation of the work coils when a localized overheating condition is present.

The inhibit signal from the thyristor control circuit inhibits the excitation of all work coils during the starting and stopping of the oscillator illustrated in FIG. 8.

The outputs of the NAND gates 130, 131, 132, 133 are fed to four D-type flip-flops $FF_{10}$ through $FF_{13}$ which are clocked by the 120 hertz zero crossing detector signal CLZ derived from the low frequency clock circuit illustrated in FIG. 11.

It can be seen that the power request signals, the pan inputs, the thermal inputs and the inhibit signal are only applied or released in sychronism with the zero crossing detector signal CLZ.

The outputs of the D-type flip-flops $FF_{10}$ through $FF_{13}$ activate four triac gate drive circuits 140, 141, 142, 143 which drive their respective triacs $TR_1$ through $TR_4$ into conduction by pulling current out of the respective triac gates $G_1$ through $G_4$ illustrated in FIG. 8.

Power request for a particular induction work coil is indicated by light emitting diodes $LED_{10}$ through $LED_{13}$ in series with appropriate resistors.

Although a preferred embodiment of this invention is illustrated, it is to be understood that various modifications and rearrangements of parts may be resorted to without departing from the scope of the invention claimed herein.

We claim:

1. An apparatus for inductively heating cooking utensils comprising:
   power supply means for providing a DC output pulsating at regular intervals between a zero point and a maximum point;
   oscillator means electrically connected to said DC output for providing an AC sinusoidal output which is fully amplitude modulated by said DC output, said sinusoidal output being in the form of power pulses defined by a pulse train of generally identical modulation envelopes;

AC switching means electrically connected to said AC sinusoidal output and operable to switch between an electrically nonconducting condition and an electrically conducting condition only when said DC output is approximately at said zero point; and at least one induction heating coil electrically connected to said AC switching means, said coil producing an alternating magnetic field only when said AC switching means is in said conducting condition, said induction heating coil being power regulated by supplying a selective number of said power pulses to said induction heating coil via said AC switching means.

2. An apparatus according to claim 1 wherein said oscillator includes;

a square wave inverter electrically connected to said DC output and operable to convert said DC output to an amplitude modulated AC square wave; and filter means operable to convert said amplitude modulated AC square wave to said AC sinusoidal output.

3. An apparatuus according to claim 2 wherein said filter means is a series resonant LC network.

4. An apparatus according to claim 2 wherein said filter means provides a relatively high impedance to all harmonic frequencies present in said AC square wave and provides approximately zero impedance to the fundamental frequency of said AC square wave.

5. An apparatus according to claim 1 wherein said induction heating coil is shunted by a capacitor so as to present an approximate power factor of unity to said AC switching means.

6. An apparatus for inductively heating cooking utensils comprising:

power supply means for providing a DC output having an amplitude verying at regular intervals between a zero voltage level and a maximum voltage level;

square wave inverter means electrically connected to said DC output for converting said DC output to a square wave AC output, said square wave AC output having an amplitude which varies in direct proportion to said DC output;

series resonant filter means electrically connected to said square wave AC output operable to convert said square wave AC output to an AC sinusoidal output, said sinusoidal AC output being in the form of power pulses defined by a pulse train of generally identical modultion envelopes, said AC sinusoidal output varying at regular interals from said zero voltage level;

a plurality of gate controlled AC semiconductor switches connected to said AC sinusoidal output, said semiconductor switches operable to switch from an electrically nonconducting condition to an electrically conducting condition only when said AC sinusoidal output is approximately at said zero voltage level; and a like plurality of induction heating coils each connected to a respective one of said AC semiconductor switches, said coils radiating alternating magnetic fields when said AC semiconductor switches are in said conducting condition, each induction heating coil being separably power regulated by supplying a selective number of said power pulses to each of said induction coils via its associated AC semiconductor switch.

7. An apparatus according to claim 6 wherein said gate controlled AC semiconductor switches are operable to switch sequentially.

8. An apparatus according to claim 6 wherein said resonant filter means is an LC network series connected between said square wave inverter means and said plurality of gate controlled AC semiconductor switches.

9. An apparatus according to claim 6 wherein each of said plurality of gate controlled AC switches is series connected between one of said like plurality of induction heating coils and said resonant filter means.

10. An apparatus according to claim 6 wherein each of said induction heating coils is shunted by a capacitor so as to present an approximate power factor of unity to said gate controlled AC semiconductor switches.

11. An apparatus for inductively heating cooking utensils comprising:

power lines providing a sinusoidal AC power output varying between a zero power value and a maximum power value, full wave rectifier means cnnected to said power lines and operable to convert said sinusoidal AC power output to DC power and providing a DC power output varying at regular intervals;

ultrasonic frequency square wave inverter means connected to said DC power output for providing an ultrasonic frequency square wave AC power output;

resonant series LC network filter means connected to said square wave AC output and operable to provide an amplitube modulated sinusoidal AC power output in the form of power pulses defined by a pulse train of generally identical modulation envelopes;

a plurality of gate controlled triac switches connected to said filter means and operable to switch from a conducting condition to a nonconducting condition only when said sinusoidal AC power output provided by said power lines is approximately at said zero power value; and a like plurality of induction heating coils each electrically connected to a respective one of said AC triac switches, said induction heating coils being separably power regulated by supplying a selective number of said power pulses to each of said induction heating coils via its associated triac switch.

12. A switching circuit for duty cycle controlling a plurality of induction heating coils excited by a common oscillator, said circuit comprising:

means for providing a first signal of fixed frequency and period, said first signal having a regularly varying amplitude;

means for providing a second signal of generally constant amplitude;

means for comparing said first signal and said second signal, said comparing means providing a third signal at the frequency of said first signal, said third signal having a period no greater than said period of said first signal;

means for generating a fourth signal of fixed frequency pulses wherein said fixed period of said first signal is not a whole number multiple of the approximate time period between pulses;

means for synchronizing the application of said third signal to a load with said fourth signal wherein said third signal is not applied to said load until a pulse of said fourth signal is presented to said means for synchronizing.

13. A switching circuit according to claim 12 wherein said third signal has a period approximately equal to the amount of time said varying amplitude of said first signal exceeds said constant amplitude of said second signal.

14. A switching circuit according to claim 12 wherein said third signal has a period approximately equal to the amount of time said constant amplitude of said second signal exceeds said varying amplitude of said first signal.

15. A switching circuit for duty cycle controlling a plurality of induction heating coils excited by a common oscillator, said circuit comprising:
a generator providing a sawtooth wave signal of fixed frequency and period;
means for providing a DC signal of constant amplitude;
means for comparing said sawtooth wave signal and said DC signal, said comparing means providing a third signal at the frequency of said sawtooth wave signal, said third signal having a period no greater than said period of said sawtooth wave signal;
means for generating a series of pulses at a fixed frequency wherein said fixed period of said sawtooth wave signal is not a whole number multiple of the approximate time period between pulses; and
means for synchronizing the application of said third signal to a load with said pulses wherein said third signal is not applied to said load until a pulse of said series is pesented to said means for synchronizing.

16. A switching circuit according to claim 15 wherein said third signal has a period approximately equal to the amount of time said sawtooth wave signal exceeds said DC signal.

17. A switching circuit according to claim 15 wherein said third signal has a period approximately equal to the amaount of time said DC signal exceeds said sawtooth wave signal.

18. A switching cirucit for duty cycle controlling a plurality of induction heating coils excited by an oscillator said circuit comprising:
lines providing AC power at a fixed frequency and a fixed period relative to a zero reference point;
means for providing a pulse signal each time said AC power is at said zero reference point;
generator means providing a switching signal of fixed frequency and fixed period, said switching signal fixed period being not a whole number multiple of the half period of said AC power;
means for providing a DC reference signal of constant amplitude;
means for comparing said switching signal and reference signal, said comparing means providing a comparator signal at the fixed frequency of said switching signal, said comparator signal having a period not greater than said switcing signal;
means for synchronizing the application of said comparator signal to a load with said pulse signal wherein said comparator signal is not applied to said load until a pulse of said pulse signal is presented to said means for synchronizing.

19. A switching circuit according to claim 18 wherein said comparator signal has a period approximately equal to the period of time said switching signal exceeds said reference signal.

20. A switching circuit according to claim 18 wherein said comparator signal has a period approximately equal to the period of time said reference signal exceeds said switching signal.

* * * * *

UNITED STATES PATENT AND TRADEMARK OFFICE
CERTIFICATE OF CORRECTION

PATENT NO. : 4,112,287
DATED : September 5, 1978
INVENTOR(S) : Robert M. Oates, Theodore M. Heinrich It is certified that error appears in the above-identified patent and that said Letters Patent are hereby corrected as shown below:

Under the caption "Description of the Preferred Embodiment", Column 10, Line 19, following the words "to supply a +24" insert -- VDC --.

Column 11, Line 7, change "appplied" to -- applied -- .

Under the caption "We Claim", in Claim 6, Column 13, Line 54, change "modultion" to -- modulation -- .

Claim 11, Column 14, Line 25, change "cnnected" to -- connected --.

Claim 17, Column 16, Line 5, change "amaount" to -- amount --

Claim 18, Column 16, Line 24, change "switcing" to -- switching -- .

Signed and Sealed this

Sixth Day of March 1979

[SEAL]

Attest:

RUTH C. MASON
Attesting Officer

DONALD W. BANNER
Commissioner of Patents and Trademarks